(12) United States Patent
Johns

(10) Patent No.: US 10,824,770 B2
(45) Date of Patent: Nov. 3, 2020

(54) WEB APPLICATION EXECUTION WITH SECURE ELEMENTS

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 174 days.

(21) Appl. No.: 16/218,761

(22) Filed: Dec. 13, 2018

(65) Prior Publication Data
US 2020/0193066 A1    Jun. 18, 2020

(51) Int. Cl.
| | | |
|---|---|---|
| G06F 21/84 | (2013.01) | |
| H04L 29/06 | (2006.01) | |
| G06F 21/60 | (2013.01) | |
| G06F 16/958 | (2019.01) | |
| G06F 21/83 | (2013.01) | |

(52) U.S. Cl.
CPC ............ *G06F 21/84* (2013.01); *G06F 16/986* (2019.01); *G06F 21/602* (2013.01); *G06F 21/83* (2013.01); *H04L 63/0428* (2013.01); *H04L 63/06* (2013.01)

(58) Field of Classification Search
CPC ........ G06F 21/84; G06F 21/602; G06F 21/83; G06F 16/986; H04L 63/0428; H04L 63/06
See application file for complete search history.

(56) References Cited

U.S. PATENT DOCUMENTS

| | | | | |
|---|---|---|---|---|
| 9,444,795 | B1* | 9/2016 | Kowalski | ................ H04L 63/06 |
| 2006/0200665 | A1* | 9/2006 | Olson | .................. H04L 63/102 |
| | | | | 713/167 |
| 2009/0187820 | A1* | 7/2009 | Stinson | .................. G06Q 30/06 |
| | | | | 715/238 |
| 2010/0023751 | A1* | 1/2010 | He | ...................... H04L 63/0428 |
| | | | | 713/150 |
| 2015/0254747 | A1* | 9/2015 | Huang | .................... H04L 67/02 |
| | | | | 705/26.43 |
| 2017/0195363 | A1* | 7/2017 | Dahan | ................... H04L 63/104 |
| 2017/0295144 | A1* | 10/2017 | Song | ...................... H04L 9/0861 |
| 2017/0346830 | A1* | 11/2017 | Goldfarb | ............... G06F 21/604 |
| 2019/0297058 | A1* | 9/2019 | Ragusa | ............... H04L 63/0428 |

* cited by examiner

*Primary Examiner* — Sher A Khan
(74) *Attorney, Agent, or Firm* — Schwegman Lundberg & Woessner, P.A.

(57) ABSTRACT

Various examples are directed to systems and methods for executing a web application with client-side encryption. A web application may execute in a web browser at a client computing device. The web browser may generate a document comprising a secure display element. The web browser may request to render the document at the client computing device. A cryptographic tool of the web browser may decrypt the first encrypted value to generate a first clear value. The web browser may render the document at an output device of the client computing device using the clear value. The web browser may also be programmed to prevent the web application from accessing the first clear value.

18 Claims, 10 Drawing Sheets

WEB APPLICATION EXECUTION WITH SECURE ELEMENTS

TECHNICAL FIELD

This document generally relates to methods and systems for use with computer devices, including networked computing devices. More particularly, this document relates to systems and methods for secure execution of web applications in a web browser.

BACKGROUND

A web browser executes at a client computing device and is capable of rendering documents and executing web applications. Documents include data that can be presented at a web browser user interface and/or received through the web browser user interface. Web applications include scripts or other code that execute in the web browser to perform various tasks for the user.

BRIEF DESCRIPTION OF DRAWINGS

The present disclosure is illustrated by way of example, and not limitation, in the following figures.

DETAILED DESCRIPTION

Figure 1:
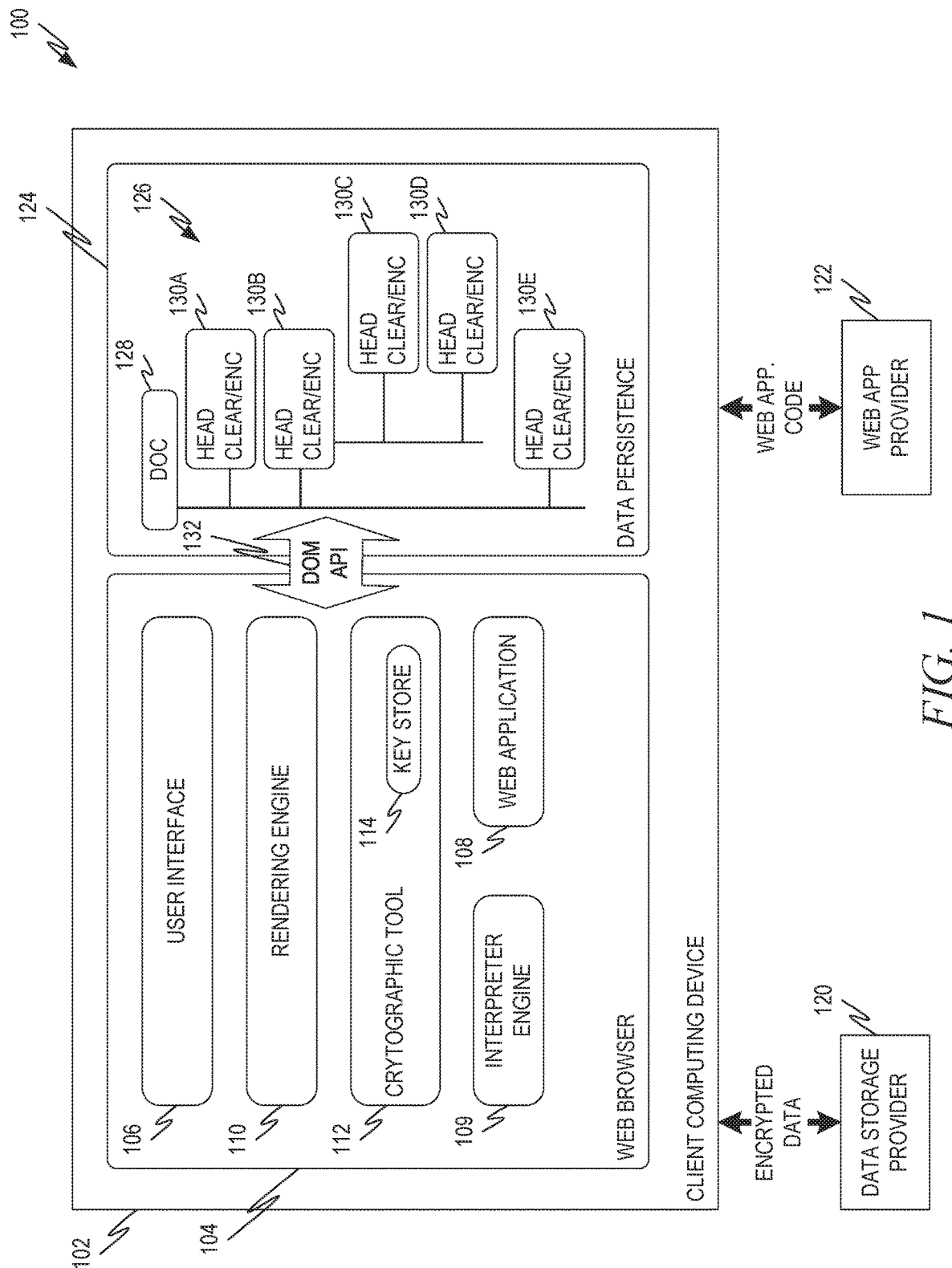
FIG. 1 is a diagram showing one example of an environment for web application execution with secure data elements.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A client computing device executes a web browser that supports the execution of web applications. Web applications are executed from web application code that is received by the web browser, for example, from a web application provider according to a Software as a Service (SaaS) model. The web application code can be received independently and/or as part of a document (e.g., a Hypertext Markup Language (HTML) or eXtensible Markup Language (XML) document). In some examples, the web application code is a script, such as JavaScript, that is executed by an interpreter engine of the web browser.

The web application can provide a user interface (UI) by downloading and/or generating HTML, XML or other suitable documents that are rendered by a rendering engine of the web browser. Documents can include elements for storing data and/or describing the way that the document should be rendered by the rendering engine. Document elements can include display elements and input elements. A display element includes data that is to be displayed by the web browser, for example, at the web browser's main viewing panel. An input element can be associated with a UI form for receiving data from a user of the client computing device. For example, an input element can describe an input field to be displayed at the web browser's main viewing panel to receive a data value from the user. Various elements of a document can be represented at the web browser according to a Document Object Model (DOM).

In some examples, it is desirable to execute a web application utilizing a remote data storage provider, for example, according to an Infrastructure as a Service (IaaS) arrangement. The web application and web browser can utilize the data storage provider by transmitting data to the data storage provider and then querying the data storage provider to retrieve the data when desired.

Utilizing a remote data storage provider can create issues related to data security. To address these, various examples utilize client-side encryption For example, the web browser can encrypt data before the data is sent to the data storage provider. The data can be stored at the data storage provider in an encrypted format. When encrypted data is retrieved from the data storage provider, the web browser can decrypt the data before use.

Client-side encryption provides data security relative to the data storage provider but may not protect data relative to web applications executing in the web browser. For example, web applications executing in the web browser may have access to the DOM associated with a document. Accordingly, even if client-side encryption is used, web applications can access clear values on the client-side. Recall that web application code is often received from the third-party web application provider and, therefore, not secure. If a web application includes malicious code, the web application may be able to defeat client-side encryption by accessing and leaking clear data. In some arrangements, a malicious web application may even be able to query the data storage provider for additional sensitive data and access the clear client-side values after decryption.

Various examples described herein address these and other issues by implementing a web browser with secure data elements. Secure data element may be included in a DOM in a manner similar to other DOM elements. Secure data elements, however, can include a clear value and an encrypted value that may be an encrypted version of the clear value. The web browser can be programmed to permit web applications to access the encrypted value of a secure element, but prevent web applications from accessing the clear value. Other web browser components, such as the rendering engine, can access the clear values. In this way, the web application UI can present clear values to a user and receive clear values from the user while the web browsers prevents the web application itself from having access to the clear values.

In some examples, secure elements include secure display elements and secure input elements. A secure display element can be referenced in a document to be rendered by the web browser. For example, the web application can generate the document to include a reference to the secure display element. The web application can optionally include the encrypted value associated with the secure display element or, in some examples, the web browser can obtain the encrypted value before rendering the document. Before or during rendering, the cryptographic tool of the web browser decrypts the encrypted value and renders the document using the resulting clear value.

A secure input element can also be included in a document to receive a data value from a user of the client computing device. When the document is rendered, the rendering engine generates a user interface (UI) form for receiving a value associated with the secure input element. A user of the client computing device can provide a clear value at the form. The cryptographic tool encrypts the clear value to generate an encrypted value. The encrypted value, then, can be provided to the web application.

FIG. 1 is a diagram showing one example of an environment 100 for secure web application execution with secure elements. The environment 100 includes the client computing device 102, which is in communication with a data storage provider 120 and a web application provider 122. The client computing device 102 may be or include any suitable computing device, such as, for example, a desktop computer, a laptop computer, a tablet computer, a mobile phone or similar devices, etc. The client computing device 102 executes a web browser 104, described in more detail below.

The web application provider 122 can similarly include one or more computing devices and may be accessible to the client computing device 102 via a network such as, for example, the Internet. The web application provider 122 can provide web application code to the client computing device, for example, as described herein. In some examples, the web application code is or includes an interpreted script such as, for example, JavaScript.

The data storage provider 120 may include any suitable computing device or devices and may be accessible to the client computing device 102 via a network such as, for example, the Internet. The data storage provider 120 can also include one or more data storage devices for storing data, as described herein. The data storage provider 120 can exchange encrypted data values with the client computing device, for example, as described herein. Examples of hardware and software arrangements for computing devices that may make up all or part of the client computing device 102, data storage provider 120 and/or web application provider 122 are provided herein with reference to FIGS. 9 and 10.

The client computing device 102 executes a web browser 104. The web browser 104 may be or include any suitable web browser including, for example, the Chrome® browser available from Google Inc., the Firefox® browser available from Mozilla Foundation, the Safari® browser available from Apple Inc., the Internet Explorer® browser available from Microsoft Corporation, the Microsoft Edge® browser available from Microsoft Corporation. The web browser 104 includes a web browser UI 106, a rendering engine 110, a cryptographic tool 112 and an interpreter engine 109. The rendering engine 110 renders documents that can, for example, by received from an external server (e.g., the web application provider 122) and/or generated by a web application 108. For example, the rendering engine 110 may convert documents (e.g., HTML or XML documents) into commands that cause the appropriate text, sounds, and/or images to be provided to displays, speakers, touch pads, or other input/output (I/O) devices of the client computing device. (See FIGS. 9-10). The interpreter engine 109 interprets web application code (e.g., scripts) to execute one or more web applications, such as the web application 108. For example, the interpreter engine 109 may be arranged to interpret JavaScript or other interpreted script code.

The web application 108 may manage the display of web content, interactions with a user, and/or other aspects of web content displayed through the web browser 104. For example, the web application 108 can provide a web application UI via the web browser UI 106. The web application 108, in some examples, includes script code received from the web application provider 122. Also, in some examples, the web application 108 calls for the execution of other scripts at the web browser 104. In some examples, the web application 108 generates or modifies dynamic scripts to be executed at the web browser 104 as a user of the client computing device 102 interacts with web content rendered at the web browser 104.

The user of the client computing device 102 accesses the web application 108 by launching the web browser 104 and selecting a Universal Resource Locator (URL) or other address associated with the web application provider 122. The address may be referred to as a web origin. The web browser 104 sends to the web application provider 122 a request for the web application 108. For example, the request may be directed to the web origin associated with the web application provider 122. The web browser 104 receives, from the web application provider 122, a response message including the requested web application code for the web application 108. The rendering engine 110 and/or interpreter engine 109 is used to execute the web application 108 and render a web application UI through the browser web browser UI 106. Additional requests and replies may be exchanged between the client computing device 102 and the web application provider 122, for example, as a user of the client computing device 102 interacts with the web application. Requests and responses between the client computing device 102 and the web application provider 122 can be arranged according to the Hypertext Transfer Protocol (HTTP) syntax.

When rendered, the web application UI can provide various different types of functionality to a user of the client computing device 102. For example, web content may provide textual, audio, or video content describing current events, sports, cultural, or other content. In some examples, the web content also provides functionality to the user. For example, the web application 108 can provide the user with functionality for executing financial transactions, making electronic purchases, accessing secure business applications, etc.

The web browser 104 also includes a cryptographic tool 112. The cryptographic tool 112 is configured to encrypt and decrypt data values associated with secure data elements. The cryptographic tool 112 can encrypt and/or decrypt data values using any suitable algorithm or method. In some examples, the cryptographic tool 112 utilizes one or more encryption algorithms that permit processing of the encrypted values. For example, the encryption tool may be configured to perform a partially or fully homomorphic encryption algorithm, an order preserving encryption algorithm, a searchable encryption algorithm, etc.

The cryptographic tool 112 can include or have access to a key store 114. The key store 114 includes one or more cryptographic keys that can be used to encrypt or decrypt data values as described herein. The key store 114 can be stored, for example, at a secure memory location at the client computing device 102, such as at the data persistence 124 described herein. The secure memory location is accessible to the cryptographic tool 112 and/or the web browser 104 but not to other components, such as the web application 108.

The client computing device also comprises data persistence 124 of the web browser. The data persistence 124 is data storage location or set of data storage locations of the client computing device 102 that are assigned to the web browser 104. The data persistence 124 can include memory locations (e.g., main memory 1004 of FIG. 10) and/or storage device locations (e.g., storage device 1016 of FIG. 10).

The web browser 104 can use the data persistence 124 to store one or more DOMs, such as the DOM 126. The DOM 126 is a representation of a document. The web browser 104 can receive the document from the web application 108 and/or from a remote web server, such as the web application provider 122. For example, the web application 108 can generate one or more documents that are rendered by the rendering engine 110 for display at the web browser UI 106. Also, in some examples, a document can represent a web page loaded by the web browser 104 from a web server. The document can be in any suitable format including, for example, HTML, XML, etc.

Upon receiving a document, the web browser 104 is optionally configured to parse the document to generate the DOM 126. In some examples, document parsing is performed by the rendering engine 110 during rendering. The web browser 104 identifies elements, such as secure data elements and/or standard DOM elements. The DOM 126 includes a document header element 128 and secure data elements 130A, 130B, 130C, 130D, 130E. The secure data elements 130A-E including a clear data value and a corresponding encrypted data value. In some examples, secure data elements 130A-E also include a header. In some examples, the header indicates a name of the corresponding element 130A-E. In some examples, the header also includes a key identification (ID) attribute indicating a cryptographic key at the key store 114 that can be used to encrypt and/or decrypt data values associated with the secure data element 130A-E. In some examples, the header also includes an algorithm attribute indicating a cryptographic algorithm that is executed by the cryptographic tool for encrypting or decrypting data values associated with the secure data elements 130A-E. In examples including data elements 130A-E that do not include either an indication of a cryptographic key or an algorithm, the cryptographic tool 112 can be configured to utilize a default cryptographic algorithm or key.

The data elements 130A-E can be secure display elements or secure input elements, for example, as described herein. In some examples, data elements 130A-E correspond to element types permitted by the HTML and/or XML formats. Also, in some example, element names, indicated at the element header, can be modifications of other (non-secure) elements in the syntax of the document. For example, a secure data element corresponding to the HTML heading level element <H1> may be called <CryptoH1> or <SecureH1>. TABLE 1 below includes example HTML elements and corresponding secure data elements. In the example of TABLE 1, secure elements are indicated by adding the prefix "Crypto" to their titles. The examples of TABLE 1 are not intended to provide an exhaustive list of potential secure elements but are instead intended only to provide examples.

TABLE 1

| HTML Element | Secure Element | Element Type |
| --- | --- | --- |
| <H1>-<H6> | <CryptoH1>-<CryptoH6> | Display Element |
| <DIV> | <CryptoDIV> | Display Element |
| <LI> | <CryptoLI> | Display Element |
| <P> | <CryptoP> | Display Element |
| <SPAN> | <CryptoSPAN> | Display Element |
| <A> | <CryptoA> | Display Element |
| <TH> | <CryptoTH> | Display Element |
| <TD> | <CryptoTD> | Display Element |
| <INPUT> | <CryptoINPUT> | Input Element |
| <OUTPUT> | <CryptoOUTPUT> | Input Element |
| <TEXTAREA> | <CryptoTEXTAREA> | Input Element |

The DOM 126 can be available to components of the web browser 104 via a DOM Application Programming Interface (API) 132 implemented by the web browser 104. The DOM API 132 can provide queries and/or commands for reading and writing values to elements 130A-E at the DOM. The queries and/or commands can be managed by the web browser 104 or a component thereof. In some examples, the web browser 104 uses the DOM API 132 to prevent the web application 108 from accessing encrypted values at the secure data elements 130A-E. For example, when a web application 108 requests a data value from a secure element 130A-E via the DOM API 132, the web browser 104 can be configured to deny access to the corresponding clear value. Other web browser components, such as the rendering engine 110, may permitted to access clear values of secure data elements 130A-E via the DOM API 132. Although one DOM 126 is shown in the example of FIG. 1, in some examples, the web browser 104 can manage multiple DOMs.

Figure 2:
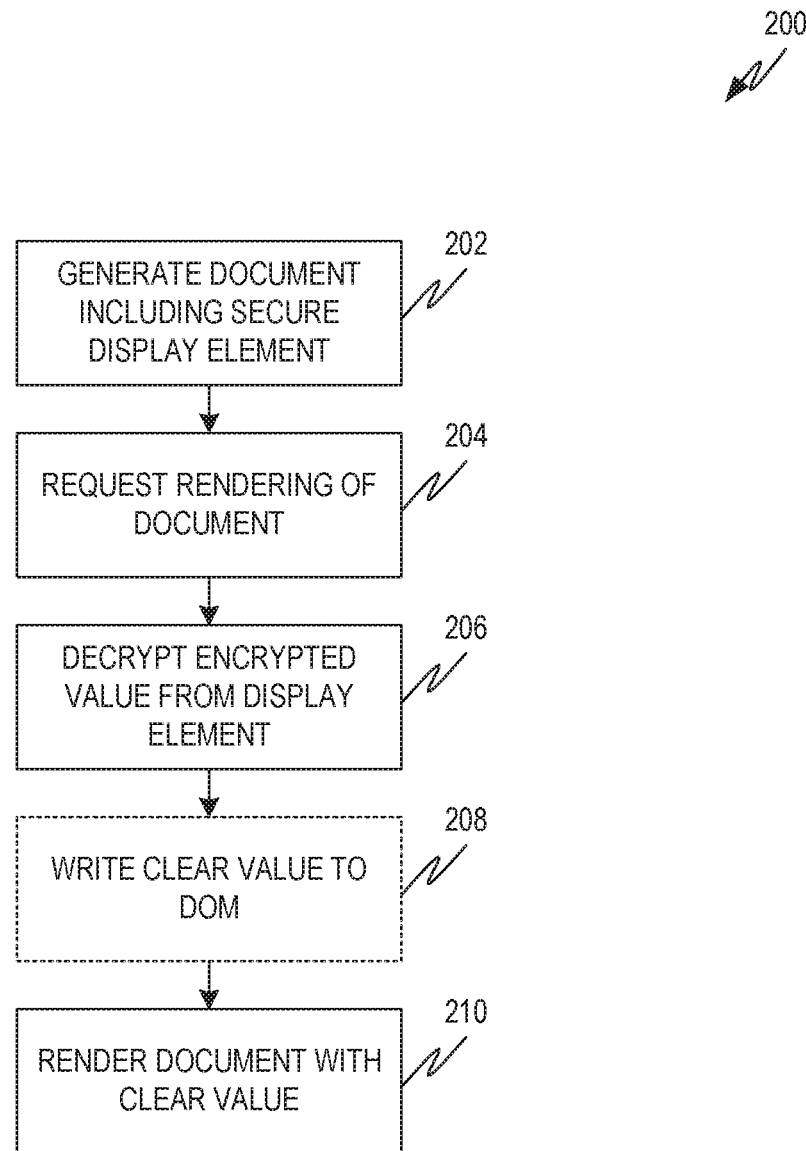
FIG. 2 is a flowchart showing one example of a process flow that can be executed at the web browser to render a document including at least one secure display element.

FIG. 2 is a flowchart showing one example of a process flow 200 that can be executed at the web browser 104 to render a document including at least one secure display element. At operation 202, the web application 108 generates a document including a secure display element. The document can be, for example, an HTML or XML document including data elements. In some examples, the document represents some or all of a web application UI that is to be provided to a user of the client computing device 102 via the web application UI 106.

The generated document includes references to a plurality of elements including at least one secure display element. The reference to the secure display element can include a tag indicating the secure display element. In some examples, the reference to the secure data element also includes other header information such as, for example, a key ID and/or an algorithm attribute.

An example reference to a secure display element that can be included in a document is provided by example Listing 1 below:

Listing 1:
1          <CryptoDIV          CMKeyID="123"
   CMAlgID="OrderPreserving">
2 AB34CEA23 . . .
3</CryptoDIV>

In this example listing, the secure display element is a DIV type element that is called "CryptoDIV." A header includes a Key ID "CMKeyID=123," where "123" references a key at the key store 114 of the cryptographic tool 112. An algorithm attribute, "CMAlgID=OrderPreserving," indicates a cryptographic algorithm that can be used by the cryptographic tool 112 as described herein. In this example, the cryptographic algorithm is an order preserving algorithm that generates encrypted algorithms that can be sorted based on attributes of the underlying clear values. The example of Listing 1 also includes a closing tag "</CryptoDIV>" that indicates an end of the secure display element.

In the example of Listing 1, an encrypted value for the secure display element is included in the document (e.g., "AB34CEA23 . . . "). In some examples, the web application 108 queries the data storage provider 120 (e.g., via the web browser 104) to retrieve the encrypted value. The web application 108 can incorporate the encrypted value in the document, for example, as shown by Listing 1, before requesting rendering of the document.

Referring back to FIG. 2, at operation 204, the web application 108 provides the document to the web browser 104 and requests that it be rendered. The web application 108 can provide the document and associated rendering request directly to the rendering engine 110, to the cryptographic tool 112 and/or to another component of the web browser 104.

At operation 206, the cryptographic tool 112 decrypts the encrypted value from the secure display element to generate a clear value. In examples where the rendering request is provided to the rendering engine 110 and/or to another component of the web browser 104, the rendering engine 110 or other component can provide the encrypted value to the cryptographic tool 112 for decrypting, for example, along with the key ID and/or algorithm attribute, if any. The cryptographic tool 112 decrypts the encrypted value according to the cryptographic key indicated the key ID and cryptographic algorithm indicated by the algorithm attribute. If no key ID or algorithm attribute is present, the cryptographic tool 112 can use a default key or algorithm. Any suitable cryptographic algorithm can be used. In some examples, a symmetric algorithm such as, for example a Data Encryption Standard (DES) algorithm, an Advanced Encryption Standard (AES) algorithm, etc. Decrypting the encrypted value yields a clear value.

At optional operation 208, the web browser 104 writes or causes the clear value to be written to an element of the DOM at the data persistence 124 that corresponds to the document generated at operation 202. For example, the cryptographic tool 112 or other suitable component of the web browser 104 can utilize the DOM API 132 to write the clear value to the DOM 126. In an example in which the DOM 126 corresponds to the document of operation 202, the web browser 104 can write the clear value to the element 130A-E at the DOM 126 that corresponds to the display element. As described herein, the DOM API 132 can be configured to prevent the web application 108 from accessing clear values of secure data elements at a DOM.

The clear value generated by the cryptographic tool 112 is also provided to the rendering engine 110. At operation 210, the rendering engine 110 renders the document, including the clear value for the secure display element, at operation 208. This can include, for example, generating one or more screens output through the web browser UI 106.

Figure 3:
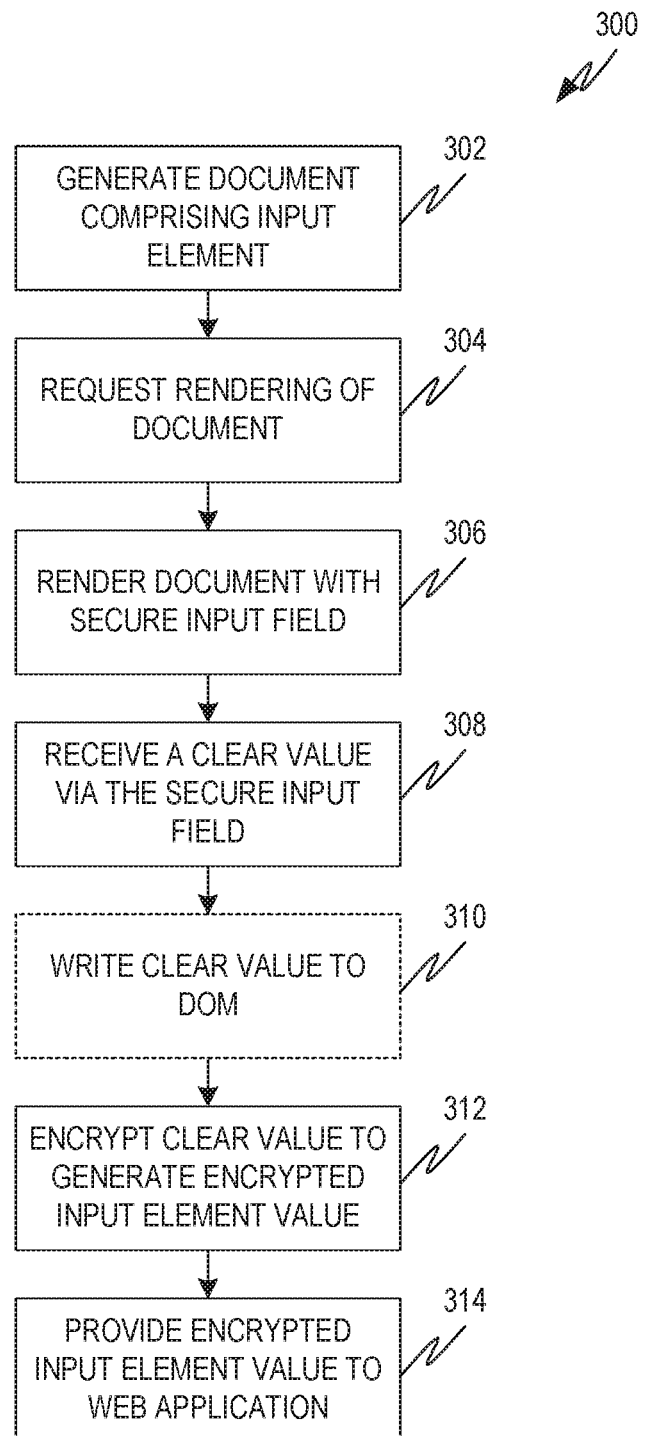
FIG. 3 is a flowchart showing one example of a process flow that can be executed at the web browser to render a document including at least one secure input element.

FIG. 3 is a flowchart showing one example of a process flow 300 that can be executed at the web browser 104 to render a document including at least one secure input element. At operation 302, the web application 108 generates a document including a secure input element. The document can represent some or all of a web application UI that is to be provided to a user of the client computing device 102 via the web application UI 106. An example representation of a secure input element in the document is provided by Listing 2 below:

Listing 2:
1 <CryptoINPUT     Type="text"     Name-"confinput"
  CMKeyID="345"
2 CMAlgID="Determinstic">

In Listing 2, the example secure input element includes a name, "confinput," which can be used to identify the input data provided by the user.

At operation 304, the web application 108 provides the document to the web browser 104 and requests that it be rendered. The web application 108 can provide the document and associated rendering request directly to the rendering engine 110, to the cryptographic tool 112 and/or to another component of the web browser 104.

At operation 306, the web browser 104 (e.g., the rendering engine 110) renders the document along with a secure input field. In some examples, the secure input field is rendered along with the remainder of the document, for example, at a main viewing panel of the web browser UI 106. In some examples, the web browser 104 generates the input field in a manner indicating to the user that data entered at the input field is secure (e.g., not available in the clear to the web application 104). For example, the input field can be clearly labeled in the main viewing panel to be an input field for receiving secure data. In some examples, the input field is provided as part of the web browser UI 106 outside of the main viewing panel, such as part of the address bar, tool bar, title bar, status bar, etc. In some examples in which the client computing device 102 includes a touch screen, the input field can be provided as a secure keyboard displayed at the touch screen for receiving date. Input received at the secure keyboard may not be accessible to the web application and can include text, color, font, or another visual element or element indicating that the keyboard is secure. In another example, generating the input field can include launching an additional secure input application with an additional UI including the input field. Graphical examples of ways that the input field can be provided are described herein with FIGS. 4-6.

At operation 308, a clear value is received via the secure input field. For example, a user of the client computing device 102 can use an input device of the client computing device to provide the clear value. At optional operation 310, the web browser 104 writes or causes the clear value to be written to an element of the DOM at the data persistence 124 that corresponds to the document generated at operation 302. For example, the cryptographic tool 112 or other suitable component of the web browser 104 can utilize the DOM API 132 to write the clear value to the DOM 126. In an example in which the DOM 126 corresponds to the document of operation 202, the web browser 104 can write the clear value to the element 130A-E at the DOM 126 that corresponds to the display element. As described herein, the DOM API 132 can be configured to prevent the web application 108 from accessing clear values of secure data elements at a DOM.

At operation 312, the cryptographic tool 112 encrypts the clear value received via the secure input field to generate an encrypted value. The cryptographic tool 112 can encrypt the clear value using a cryptographic key indicated by a key ID of the secure input element and a cryptographic algorithm indicated by an algorithm attribute. If no key ID or algorithm element was indicated at the secure input element, the cryptographic field 112 can use a default key and/or algorithm.

At operation 314, the web browser 104 can provide the encrypted value generated at operation 312 to the web application 108. In some examples, the web application transmits the encrypted value directly to the web application 108. In addition to or instead of sending the encrypted value directly to the web application 108, the web browser 104 can expose the encrypted value via the DOM API 132. For example, the web application 108 can use the DOM API 132 to request a value of the secure input element. In response, the web application 108 may receive the encrypted value.

Figure 4:
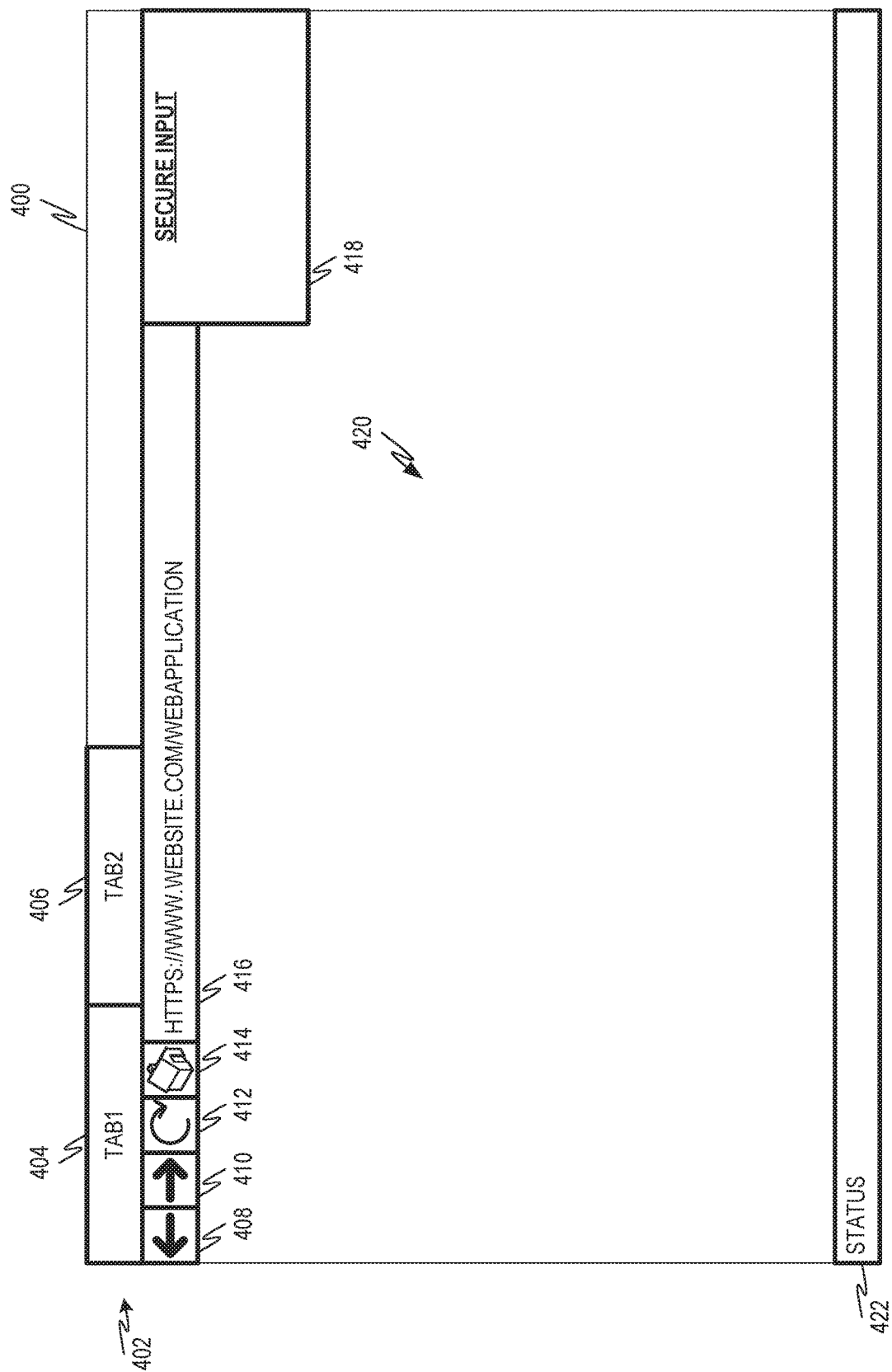
FIG. 4 is a diagram showing one example of a screen of the web browser UI demonstrating a secure input field.

FIG. 4 is a diagram showing one example of a screen 400 of the web browser UI 106 demonstrating a secure input field 418. The screen includes a main viewing panel 420 in which the document generated by the web application 108 is rendered. The screen also includes various other features of the web browser UI 106 including, for example, a tab bar 402 including tabs 404, 406. Each tab 404, 406, when selected, can cause the web browser 104 to display a different main viewing panel 420, for example, rendering a different document. Navigation buttons 408, 410, 412, 414 can be selected by the user to navigate between rendered documents. An address bar 416 can receive a URL or other address from the user for directing the web browser 104 to a particular web server, such as the web app provider 122. A status bar 422 is also shown.

In the example of FIG. 4, the secure input field 418 is separate from the main viewing panel 420 and contiguous with another element of the web browser UI 106. For example, as shown in FIG. 4, the secure input field 418 is contiguous with the address bar 416. In other arrangements, the secure input field 418 can be contiguous with other UI components of the web browser UI 106 such as, for example, navigation buttons 408, 410, 412, 414, status bar 422, tab bar 402, etc. In some examples, the secure input field 418 can also have features similar to those of other web browser UI components with which it is contiguous such common colors, shadings, font, etc. In some examples, the secure input field 418 can be positioned over the main viewing panel 420 in a manner that is not contiguous with any other web browser UI components. In such an arrangement, the secure input field 418 can have features similar to those of the other web browser UI component to distinguish it from the rendered document in the main viewing panel.

Figure 5:
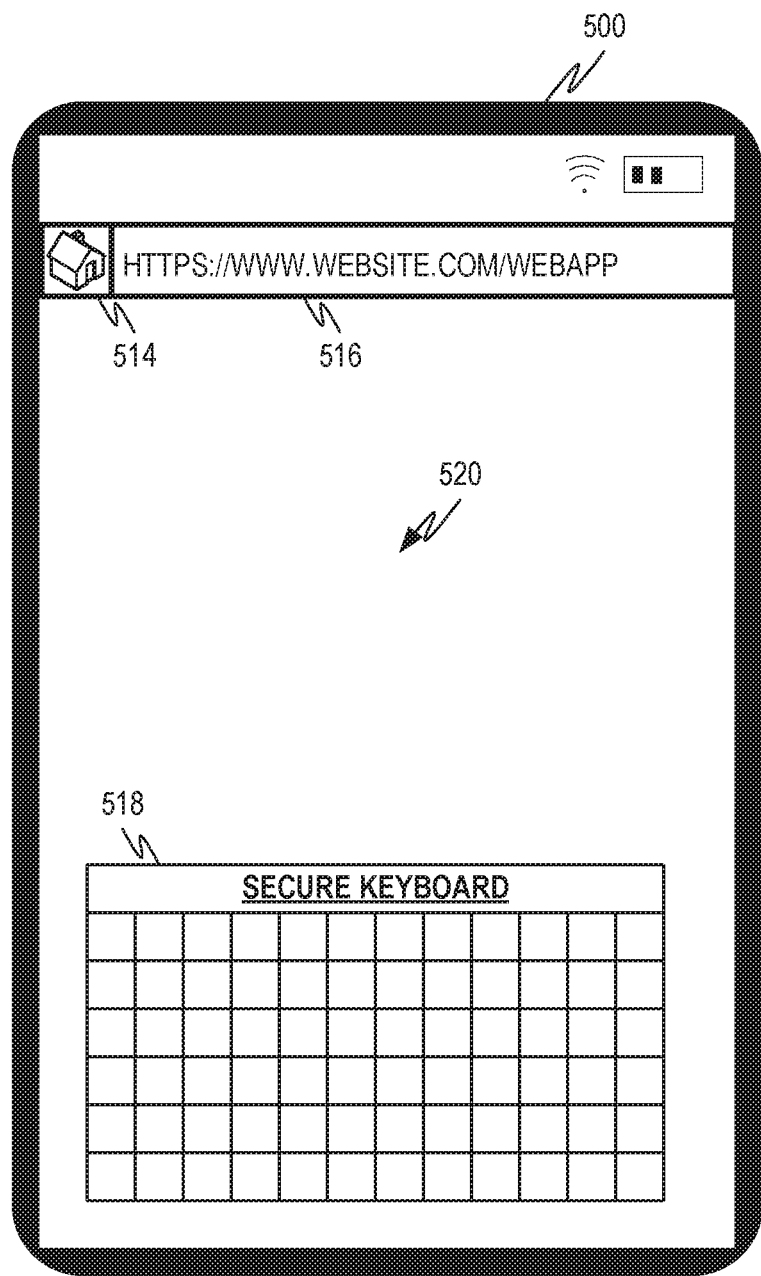
FIG. 5 is a diagram showing one example of a screen of the web browser UI with a secure keyboard.

FIG. 5 is a diagram showing one example of a screen 500 of the web browser UI 106 with a secure keyboard. The screen 500 may be displayed, for example, when the client computing device 102 is a mobile device having a touchscreen display. The screen 500 comprises a main viewing panel 520 and navigation components including a home button 514 and an address bar 516. The secure input field comprises a secure keyboard 518. A user can use the secure keyboard 518 to enter a clear value that can be utilized, for example, as described with respect to the process flow 300.

Figure 6:
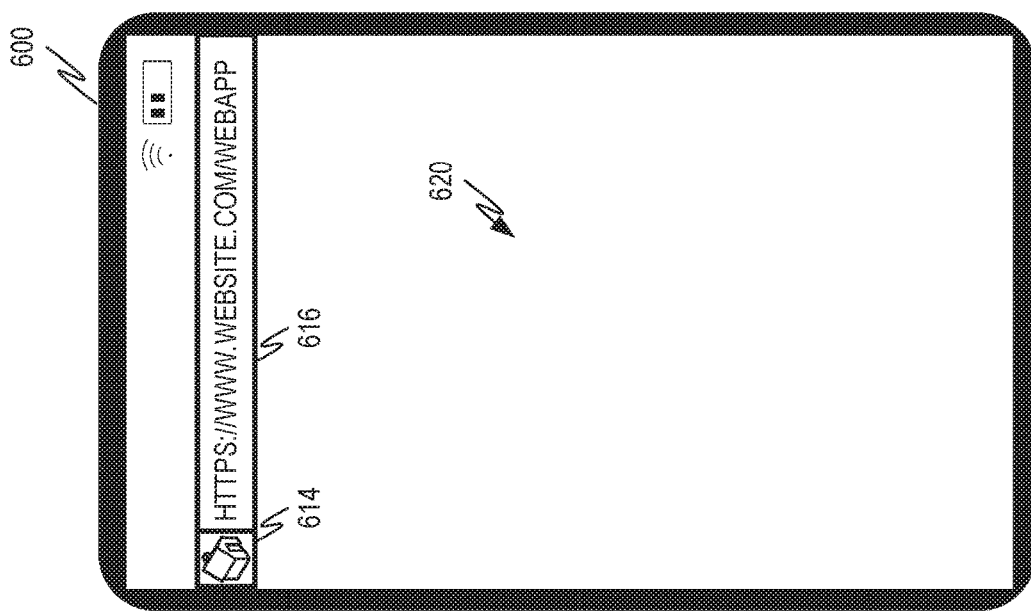
FIG. 6 is a diagram showing another example of a screen illustrating the launch of an additional input application including a secure input field.
Figure 6:
Figure 6:
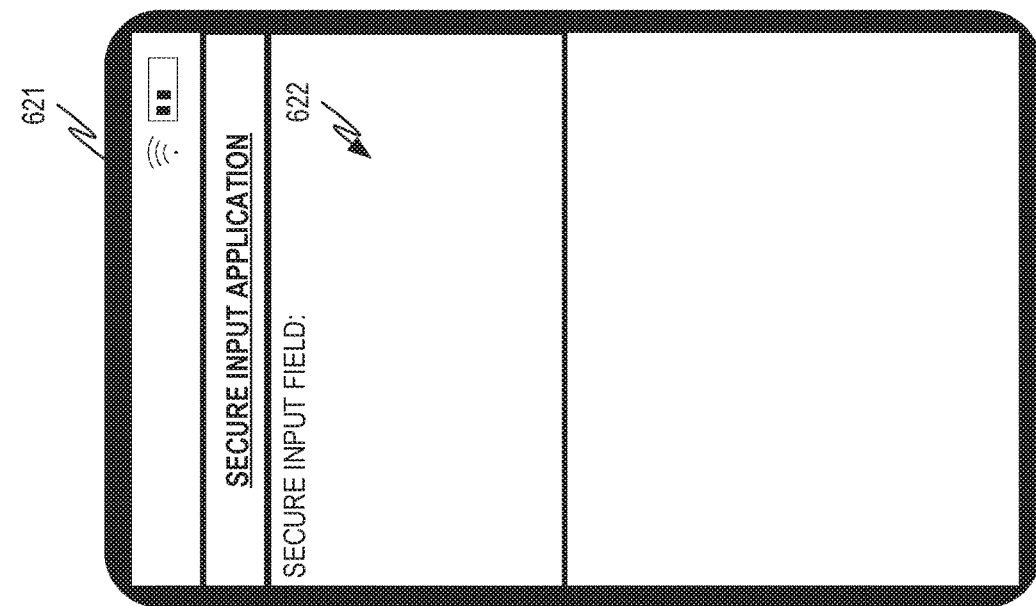

FIG. 6 is a diagram showing another example of a screen 600 illustrating the launch of an additional input application including a secure input field 622. The screen 600 is from an example web browser UI 106 and includes a main viewing panel 620, an address bar 616, and a home button 614. When the web browser 104 is to generate a secure input field, it man launch a secure input application. An example of a UI screen 621 from a secure input application is also shown. The UI screen 621 may include text, colors, or other formatting indicating that it is for secure input. The example in FIG. 6 shows a secure input field 622.

Figure 7:
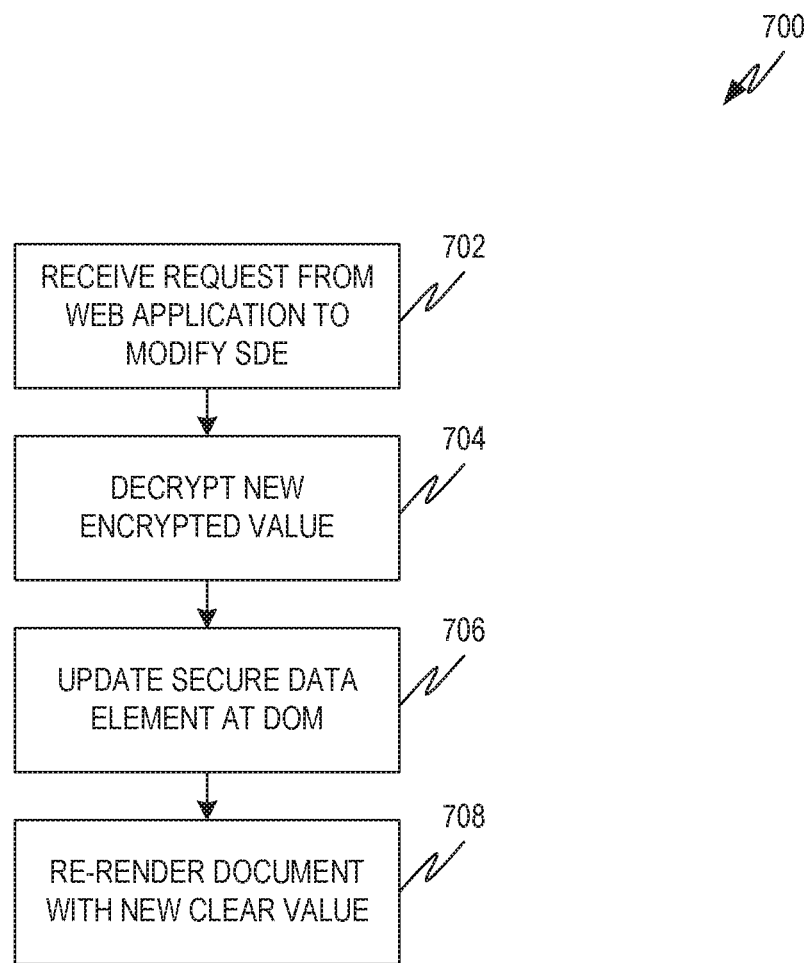
FIG. 7 is a flowchart showing one example of a process flow that can be executed by the web browser when the web application modifies a secure element.

FIG. 7 is a flowchart showing one example of a process flow 700 that can be executed by the web browser 104 when the web application modifies a secure element. The web browser 104 can modify secure data elements, for example, utilizing the DOM API 132. At operation 702, the web browser 104 receives a request from the web application to modify a secure data element. The request can be submitted via the DOM API 132 and can include an encrypted value for the secure data element. The request can also indicate the secure data element to which it is directed.

At operation 704, the cryptographic tool 112 decrypts the encrypted value to generate a clear value. The cryptographic tool 112 can decrypt the encrypted value using the key indicated by a key ID of the secure data element and using an algorithm indicated by a cryptographic algorithm attribute of the secure data element. If no key ID and/or algorithm attribute is present at the secure data element, the cryptographic tool 112 can use a default key and/or cryptographic algorithm.

At operation 706, the web browser 104 updates the secure data element at the DOM 126. The web browser 104 can replace the encrypted value at the corresponding DOM element with the encrypted value received at operation 702 and replace the clear value at the corresponding DOM element with the clear value generated at operation 704. At optional operation 708, the web browser 104 (e.g., the rendering engine 110) can re-render the document that includes the modified secure data element to reflect the new clear value.

Listing 3 below is an example demonstrating an application of the process flow 700.

Listing 3:

| 1 | <CryptoDIV ID="CM1" CMKeyID="911" CMAIgID="Deterministic"> |
|---|---|
| 2 | </CryptoDIV> |
| 3 | |
| 4 | <CryptoINPUT ID="CM2" Type="text" name="conf" CMKeyID="911",! CMAIgID="Deterministic" onchange="moveData( )"> |
| 5 | |
| 6 | <script> |
| 7 | function moveData( ){ |
| 8 | var cm1 = document.getElementById("CM1"); |
| 9 | var cm2 = document.getElementById("CM2"); |
| 10 | var cValue = cm2.value   // cValue is encrypted |
| 11 | cm1.innerText = cValue; |
| 12 | } |
| 13 | </script> |

Lines 1-2 represent a secure data element that is a secure display element called "CM1." The secure display element CM1 includes a key ID ("911") and an algorithm attribute ("Deterministic"). Line4 represents another secure data element that is a secure input element called "CM2." The secure input element is also described by a type ("text"), a name "conf," a key ID ("911"), an algorithm attribute ("Deterministic") and an indication of a function ("moveData( )") that is to be called upon a change at the secure input field.

Lines 6-13 show a script that implements the moveData( ) function. When a user enters a clear value (e.g., text) into the secure input field corresponding to the secure input element CM2, the function moveData( ) is called. The function moveData( ) is executed as all or part of a web application and, therefore, is not provided with access to clear data via the DOM API 132. The operation at line 10 would set the variable cValue to the value of the secure input element CM2. Because the function moveData( ) does not have access to the clear values of secure data elements, the web browser 104 uses the cryptographic tool 112 to encrypt the received clear value and instead provides the function with a corresponding encrypted value.

The operation at line 11 would set the secure display element CM1 equal to the value of the variable cValue. Recall that after the operation of line 10, cValue was set equal to the encrypted value of the input element CM2. Accordingly, upon the execution of the script at line 11, the web browser can execute the process flow 300 to render the secure display element CM1 using the clear value of the display element CM2.

Figure 8:
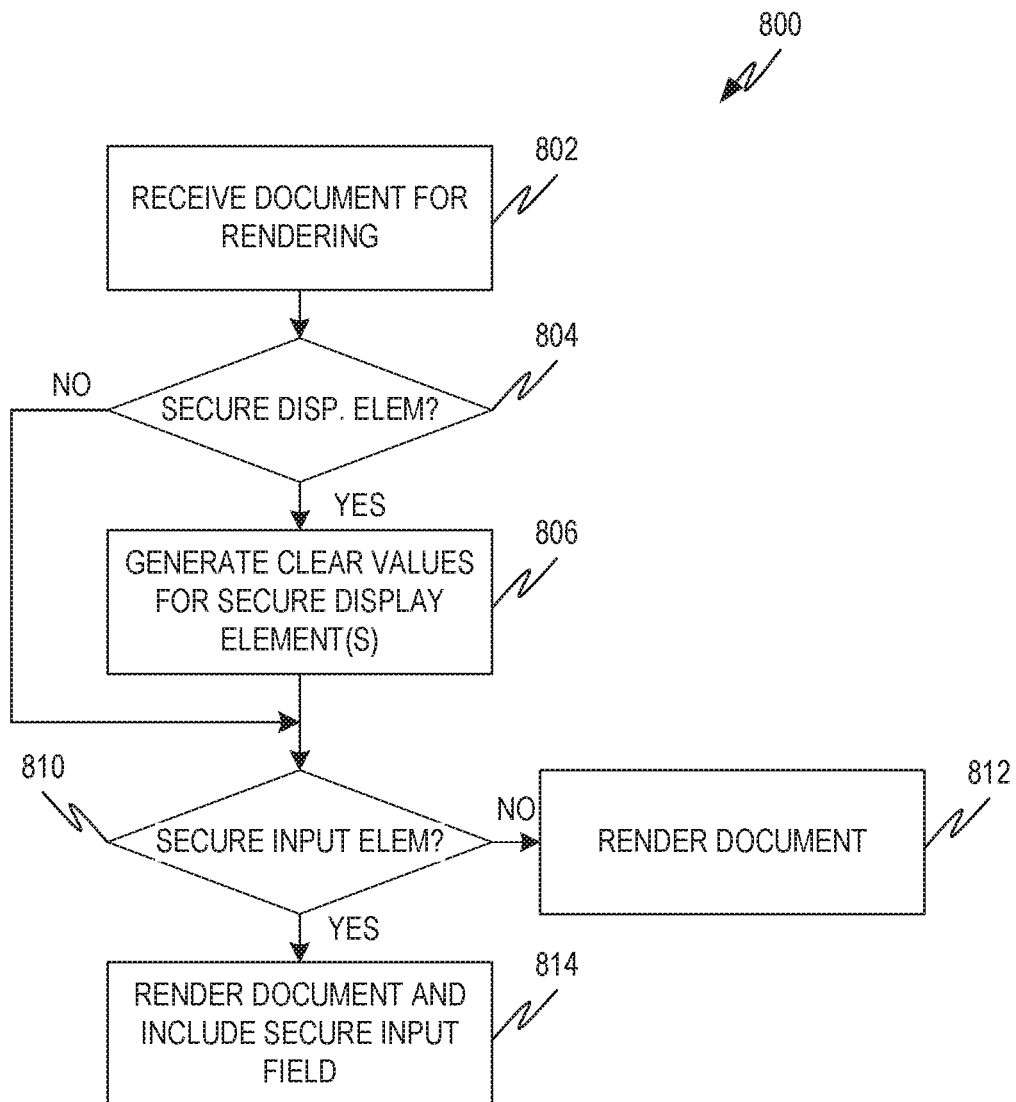
FIG. 8 is a flowchart showing one example of a process flow that can be executed by the web browser render a document that includes at least one secure display element and at least one secure input element.

FIG. 8 is a flowchart showing one example of a process flow 800 that can be executed by the web browser 104 to render a document that includes at least one secure display element and at least one secure input element. At operation 802, the web browser 104 receives a document for rendering. The document can be generated, for example, by the web application 108 as described herein. In some examples, the web browser 104 parses the document to generate a corresponding DOM and stores the DOM at the data persistence 124.

At operation 804, the web browser 104 determines whether the document includes a secure display element. If the document includes a secure display element, the web browser generates a clear value for each included secure display element. This can be done, for example, as described with respect to operations 206 and 208 above.

Upon generating clear values at operation 806 or if there are no secure display elements in the document at operation 804, the web browser 104 determines if there are any secure input elements in the document at operation 810. If there are no secure input elements, then the web browser 104 (e.g., the rendering engine 110 thereof) renders the document at operation 812, for example, using clear values determined at operation 806. If there is a secure display element, the web browser 104 (e.g., the rendering engine) renders the document at operation 814 including one or more secure input fields, as described herein.

EXAMPLES

Example 1 is a system for executing a web application with client-side encryption, the system comprising: a client computing device comprising at least one hardware processor programmed to execute a web browser and an output device, wherein the client computing device is also programmed to perform operations comprising: generating a document by a web application executing in the web browser, wherein the document comprises a plurality of elements including a secure display element, the secure display element comprising a secure display element name and a first encrypted value; requesting, by the web application, to render the document at the client computing device; decrypting, by a cryptographic tool of the web browser, the first encrypted value to generate a first clear value, wherein the web browser is programmed to prevent the web application from accessing the first clear value; and rendering the document with a rendering engine of the web browser at the output device of the client computing device, the rendering using the first clear value.

In Example 2, the subject matter of Example 1 optionally includes wherein the secure display element further comprises an indication of a cryptographic key stored at a key store of the cryptographic tool, and wherein the decrypting is based at least in part on the cryptographic key.

In Example 3, the subject matter of any one or more of Examples 1-2 optionally includes wherein the secure display element further comprises an indication of a cryptographic algorithm, and wherein the decrypting comprises executing the cryptographic algorithm.

In Example 4, the subject matter of any one or more of Examples 1-3 optionally includes wherein the operations further comprise: determining, by the web browser, that the web application has modified the first encrypted value to a modified first encrypted value; decrypting, by the cryptographic tool, the modified first encrypted value to generate a modified first clear value; and modifying the rendering of the document to replace the first clear value with the modified first clear value.

In Example 5, the subject matter of any one or more of Examples 1-4 optionally include wherein the plurality of elements also comprises a secure input element, and wherein the operations further comprise: displaying a secure input field; receiving a second clear value, by the web browser via the secure input field; encrypting, by the cryptographic tool, the second clear value using a cryptographic key indicated by the secure input element to generate a second encrypted value; and providing, by the web browser, the second encrypted value to the web application, wherein the web browser is programmed to prevent the web application from accessing the second clear value.

In Example 6, the subject matter of Example 5 optionally includes wherein the secure input field is displayed at a user interface of the web browser.

In Example 7, the subject matter of any one or more of Examples 5-6 optionally includes wherein the client computing device comprises a touchscreen, and wherein the operations further comprise displaying at the touchscreen a secure keyboard for receiving the second clear value.

In Example 8, the subject matter of any one or more of Examples 5-7 optionally includes wherein the operations further comprise launching a secure input application to provide an input application user interface comprising the secure input field.

Example 9 is a method for executing a web application with client-side encryption, the method comprising: generating a document by the web application, the web application executing in a web browser at a client computing device, wherein the document comprises a plurality of elements including a secure display element, the secure display element comprising a secure display element name and a first encrypted value; requesting, by the web application, to render the document at the client computing device; decrypting, by a cryptographic tool of the web browser, the first encrypted value to generate a first clear value, wherein the web browser is programmed to prevent the web application from accessing the first clear value; and rendering the document with a rendering engine of the web browser at an output device of the client computing device, the rendering using the first clear value.

In Example 10, the subject matter of Example 9 optionally includes wherein the secure display element further comprises an indication of a cryptographic key stored at a key store of the cryptographic tool, and wherein the decrypting is based at least in part on the cryptographic key.

In Example 11, the subject matter of any one or more of Examples 9-10 optionally includes wherein the secure display element further comprises an indication of a cryptographic algorithm, and wherein the decrypting comprises executing the cryptographic algorithm.

In Example 12, the subject matter of any one or more of Examples 9-11 optionally includes determining, by the web browser, that the web application has modified the first encrypted value to a modified first encrypted value; decrypting, by the cryptographic tool, the modified first encrypted value to generate a modified first clear value; and modifying the rendering of the document to replace the first clear value with the modified first clear value.

In Example 13, the subject matter of any one or more of Examples 9-12 optionally includes wherein the plurality of elements also comprises a secure input element, further comprising: displaying a secure input field; receiving a second clear value, by the web browser via the secure input field; encrypting, by the cryptographic tool, the second clear value using a cryptographic key indicated by the secure input element to generate a second encrypted value; and providing, by the web browser, the second encrypted value to the web application, wherein the web browser is programmed to prevent the web application from accessing the second clear value.

In Example 14, the subject matter of Example 13 optionally includes wherein the secure input field is displayed at a user interface of the web browser.

1 In Example 15, the subject matter of any one or more of Examples 13-14 optionally includes wherein the client computing device comprises a touchscreen, further comprising displaying at the touchscreen a secure keyboard for receiving the second clear value.

In Example 16, the subject matter of any one or more of Examples 13-15 optionally includes launching a secure input application to provide an input application user interface comprising the secure input field.

Example 17 is a non-transitory machine-readable medium comprising instructions thereon that, when executed by at least one hardware processor, cause the at least one hardware processor to perform operations comprising: generating a document by a web application, the web application executing in a web browser executed by the at least one hardware processor, wherein the document comprises a plurality of elements including a secure display element, the secure display element comprising a secure display element name and a first encrypted value; requesting, by the web application, to render the document at the client computing device; decrypting, by a cryptographic tool of the web browser, the first encrypted value to generate a first clear value, wherein the web browser is programmed to prevent the web application from accessing the first clear value; and rendering the document with a rendering engine of the web browser at an output device associated with the at least one hardware processor, the rendering using the first clear value.

In Example 18, the subject matter of Example 17 optionally includes determining, by the web browser, that the web application has modified the first encrypted value to a modified first encrypted value; decrypting, by the cryptographic tool, the modified first encrypted value to generate a modified first clear value; and modifying the rendering of the document to replace the first clear value with the modified first clear value.

In Example 19, the subject matter of any one or more of Examples 17-18 optionally includes wherein the plurality of elements also comprises a secure input element, further comprising: displaying a secure input field; receiving a second clear value, by the web browser via the secure input field; encrypting, by the cryptographic tool, the second clear value using a cryptographic key indicated by the secure input element to generate a second encrypted value; and providing, by the web browser, the second encrypted value to the web application, wherein the web browser is programmed to prevent the web application from accessing the second clear value.

In Example 20, the subject matter of Example 19 optionally includes wherein the secure input field is displayed at a user interface of the web browser.

Figure 9:
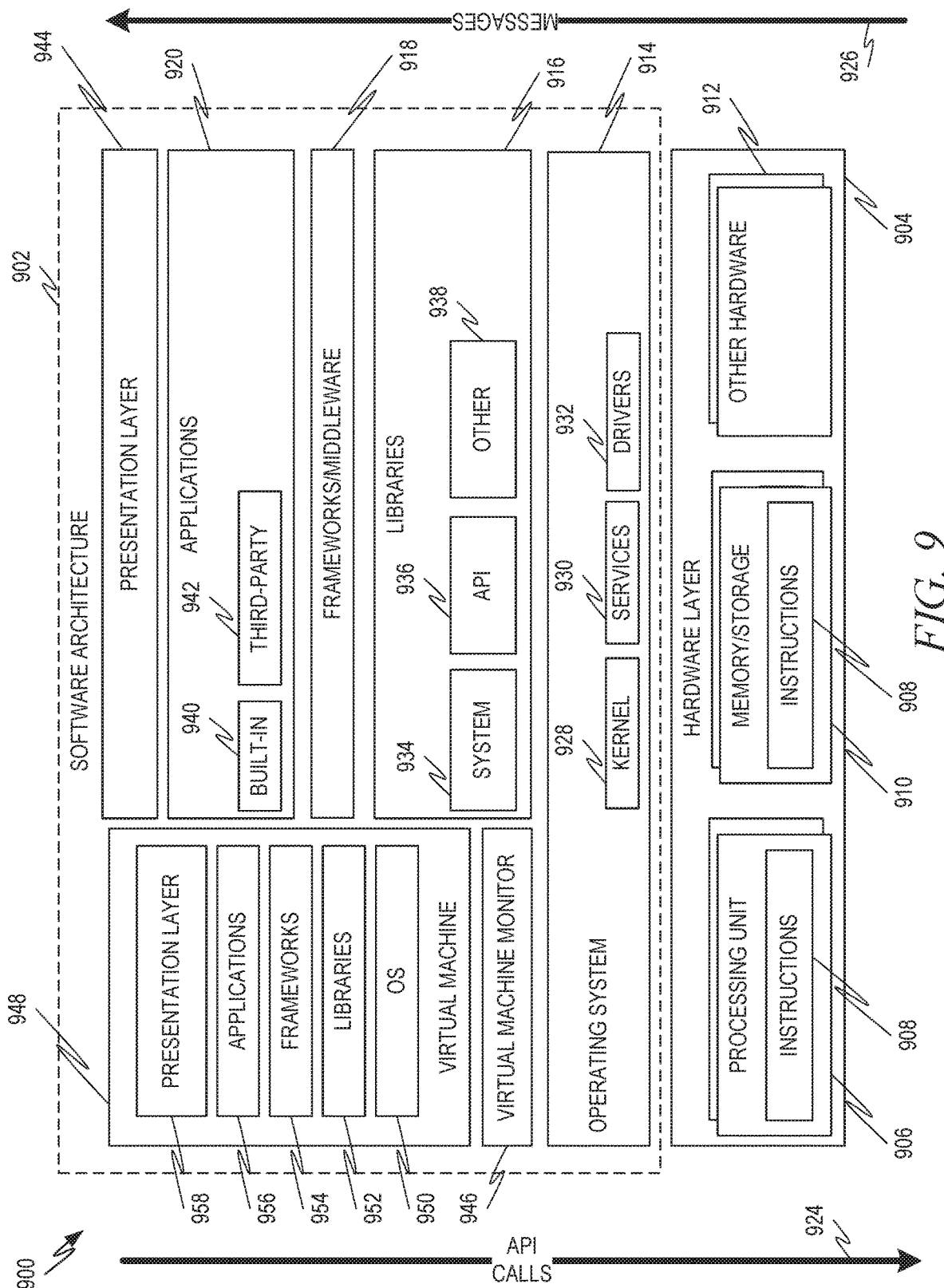
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system 1000 of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated as part of computer system 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth®) drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules. In some examples, libraries 916 may provide one or more APIs serviced by a message oriented middleware.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows, Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine 948 is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
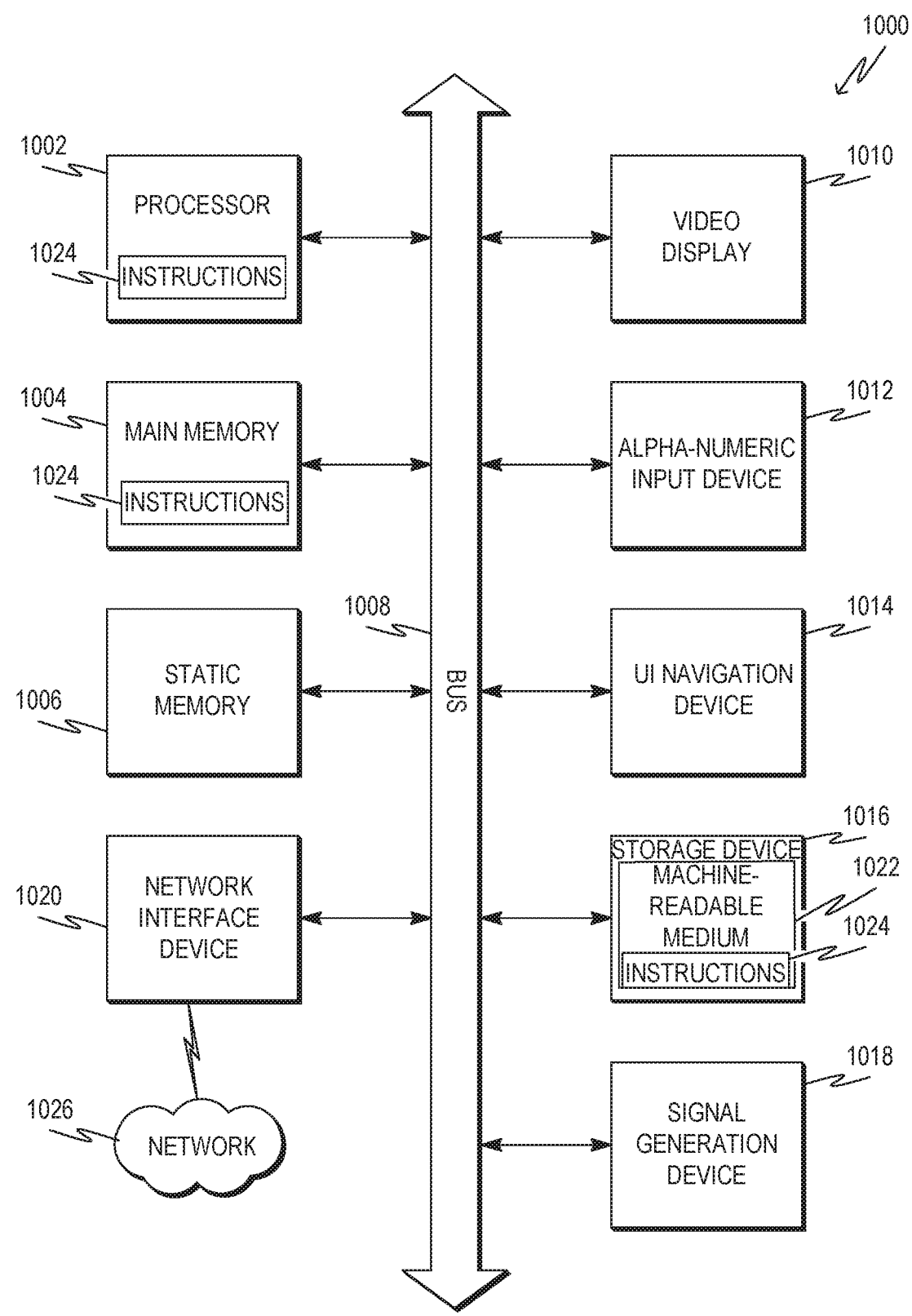
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1050 (e.g., a liquid crystal display (LCD) or a cathode ray tube (CRT)). The computer system 1000 also includes an alphanumeric input device 1052 (e.g., a keyboard or a touch-sensitive display screen), a user interface (UI) navigation (or cursor control) device 1054 (e.g., a mouse), a disk drive device 1056, a signal generation device 1058 (e.g., a speaker), and a network interface device 1020.

Machine-Readable Medium

The disk drive unit 1056 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for executing a web application with client-side encryption, the system comprising:

a client computing device comprising at least one hardware processor programmed to execute a web browser and an output device, wherein the client computing device is also programmed to perform operations comprising:

generating a document by a web application executing in the web browser, wherein the document comprises a plurality of elements, the plurality of elements comprising a secure display element and a secure input element, the secure display element comprising a secure display element name and a first encrypted value;

requesting, by the web application, to render the document at the client computing device;

decrypting, by a cryptographic tool of the web browser, the first encrypted value to generate a first clear value, wherein the web browser is programmed to prevent the web application from accessing the first clear value;

rendering the document with a rendering engine of the web browser at the output device of the client computing device, the rendering using the first clear value;

displaying a secure input field at a user interface of the web browser;

receiving, by the web browser, a second clear value via the secure input field;

encrypting, by the cryptographic tool, the second clear value using a cryptographic key indicated by the secure input element to generate a second encrypted value; and providing, by the web browser, the second encrypted value to the web application, wherein the web browser is programmed to prevent the web application from accessing the second clear value.

2. The system of claim 1, wherein the secure display element further comprises an indication of a cryptographic key stored at a key store of the cryptographic tool, and wherein the decrypting is based at least in part on the cryptographic key.

3. The system of claim 1, wherein the secure display element further comprises an indication of a cryptographic algorithm, and wherein the decrypting comprises executing the cryptographic algorithm.

4. The system of claim 1, wherein the operations further comprise:

determining, by the web browser, that the web application has modified the first encrypted value to a modified first encrypted value;

decrypting, by the cryptographic tool, the modified first encrypted value to generate a modified first clear value; and modifying the rendering of the document to replace the first clear value with the modified first clear value.

5. The system of claim 1, wherein the client computing device comprises a touchscreen, and wherein the operations further comprise displaying at the touchscreen a secure keyboard for receiving the second clear value.

6. The system of claim 1, wherein the operations further comprise launching a secure input application to provide an input application user interface comprising the secure input field.

7. A method for executing a web application with client-side encryption, the method comprising:
generating a document by the web application, the web application executing in a web browser at a client computing device, wherein the document comprises a plurality of elements, the plurality of elements comprising a secure display element and a secure input element, the secure display element comprising a secure display element name and a first encrypted value;
requesting, by the web application, to render the document at the client computing device;
decrypting, by a cryptographic tool of the web browser, the first encrypted value to generate a first clear value, wherein the web browser is programmed to prevent the web application from accessing the first clear value;
rendering the document with a rendering engine of the web browser at an output device of the client computing device, the rendering using the first clear value;
displaying a secure input field at a user interface of the web browser;
receiving, by the web browser, a second clear value via the secure input field;
encrypting, by the cryptographic tool, the second clear value using a cryptographic key indicated by the secure input element to generate a second encrypted value; and
providing, by the web browser, the second encrypted value to the web application, wherein the web browser is programmed to prevent the web application from accessing the second clear value.

8. The method of claim 7, wherein the secure display element further comprises an indication of a cryptographic key stored at a key store of the cryptographic tool, and wherein the decrypting is based at least in part on the cryptographic key.

9. The method of claim 7, wherein the secure display element further comprises an indication of a cryptographic algorithm, and wherein the decrypting comprises executing the cryptographic algorithm.

10. The method of claim 7, further comprising:
determining, by the web browser, that the web application has modified the first encrypted value to a modified first encrypted value;
decrypting, by the cryptographic tool, the modified first encrypted value to generate a modified first clear value; and
modifying the rendering of the document to replace the first clear value with the modified first clear value.

11. The method of claim 7, wherein the client computing device comprises a touchscreen, further comprising displaying at the touchscreen a secure keyboard for receiving the second clear value.

12. The method of claim 7, further comprising launching a secure input application to provide an input application user interface comprising the secure input field.

13. A non-transitory machine-readable medium comprising instructions thereon that, when executed by at least one hardware processor, cause the at least one hardware processor to perform operations comprising:
generating a document by a web application, the web application executing in a web browser executed by the at least one hardware processor, wherein the document comprises a plurality of elements, the plurality of elements comprising a secure display element and a secure input element, the secure display element comprising a secure display element name and a first encrypted value;
requesting, by the web application, to render the document at a display in communication with the at least one hardware processor;
decrypting, by a cryptographic tool of the web browser, the first encrypted value to generate a first clear value, wherein the web browser is programmed to prevent the web application from accessing the first clear value;
rendering the document with a rendering engine of the web browser at an output device associated with the at least one hardware processor, the rendering using the first clear value;
displaying a secure input field at a user interface of the web browser;
receiving, by the web browser, a second clear value via the secure input field;
encrypting, by the cryptographic tool, the second clear value using a cryptographic key indicated by the secure input element to generate a second encrypted value; and
providing, by the web browser, the second encrypted value to the web application, wherein the web browser is programmed to prevent the web application from accessing the second clear value.

14. The medium of claim 13, further comprising:
determining, by the web browser, that the web application has modified the first encrypted value to a modified first encrypted value;
decrypting, by the cryptographic tool, the modified first encrypted value to generate a modified first clear value; and
modifying the rendering of the document to replace the first clear value with the modified first clear value.

15. The medium of claim 13, wherein the secure display element further comprises an indication of a cryptographic key stored at a key store of the cryptographic tool, and wherein the decrypting is based at least in part on the cryptographic key.

16. The medium of claim 13, wherein the secure display element further comprises an indication of a cryptographic algorithm, and wherein the decrypting comprises executing the cryptographic algorithm.

17. The medium of claim 13, the operations further comprising displaying a secure keyboard for receiving the second clear value at the display.

18. The medium of claim 13, the operations further comprising launching a secure input application to provide an input application user interface comprising the secure input field.

* * * * *